US008095236B2

(12) United States Patent
Rudy et al.

(10) Patent No.: US 8,095,236 B2
(45) Date of Patent: Jan. 10, 2012

(54) SYSTEM AND METHOD FOR REMOTELY BUYING, RENTING, AND/OR SELLING MEDIA DISCS

(75) Inventors: Alan T. Rudy, New Albany, OH (US); Bob Murray, Dublin, OH (US); Alan Wolf, Dublin, OH (US)

(73) Assignee: Into Great Companies, Inc., Columbus, OH (US)

( * ) Notice: Subject to any disclaimer, the term of this patent is extended or adjusted under 35 U.S.C. 154(b) by 439 days.

(21) Appl. No.: 12/118,801

(22) Filed: Jun. 26, 2008

(65) Prior Publication Data

US 2009/0326708 A1 Dec. 31, 2009

(51) Int. Cl.
*G06F 17/00* (2006.01)

(52) U.S. Cl. ......... 700/238; 700/231; 700/232; 700/236

(58) Field of Classification Search .................. 700/236, 700/238

See application file for complete search history.

(56) References Cited

U.S. PATENT DOCUMENTS

| | | | |
|---|---|---|---|
| 4,519,522 | A | 5/1985 | McElwee |
| 4,608,679 | A | 8/1986 | Rudy et al. |
| 4,668,150 | A | 5/1987 | Blumberg |
| 4,814,592 | A | 3/1989 | Bradt et al. |
| 5,042,686 | A | 8/1991 | Stucki |
| 5,143,193 | A | 9/1992 | Geraci |
| 5,159,560 | A | 10/1992 | Newell |
| 5,206,814 | A | 4/1993 | Cahlander |
| 5,219,094 | A | 6/1993 | Labriola |
| 5,320,219 | A | 6/1994 | Ward |
| 5,418,763 | A | 5/1995 | Ichikawa et al. |
| 5,523,551 | A | 6/1996 | Scott |
| 5,528,566 | A | 6/1996 | McGee et al. |
| 5,633,839 | A | 5/1997 | Alexander et al. |
| 5,641,092 | A | 6/1997 | Scott |
| 5,647,505 | A | 7/1997 | Scott |

(Continued)

FOREIGN PATENT DOCUMENTS

CA 1207411 A1 7/1986

(Continued)

OTHER PUBLICATIONS

Xiris DO1600 Disc Orientation System Technical Specification, www.xiris.com, Apr. 2006.

*Primary Examiner* — Timothy Waggoner

(74) *Attorney, Agent, or Firm* — Hahn, Loeser & Parks LLP; Arland T. Stein

(57) ABSTRACT

A kiosk or machine for buying media discs includes a dispense/receive system for dispensing the media discs to consumers and receiving media discs from customers, a disc identification system for identifying the media discs, a disc transfer system for moving the media discs within the kiosk, a control system operably connected to dispense/receive system, the disc transfer system, and a user interface system. The user interface includes a buy-back indicator or prompt which can be selectively activated by the customer. In response to activation of the buy-back indicator, the controller activates the dispense/receive system to receive a media disc for buy-back, activates the disc transfer system to move the media disc to the disc identification system, activates the disc identification system to identify the media disc, determines a buy-back price for the media disc, and activates the user interface system to display the buy-back price.

15 Claims, 7 Drawing Sheets

U.S. PATENT DOCUMENTS

| | | | | |
|---|---|---|---|---|
| 5,673,195 | A | 9/1997 | Schwartz | |
| 5,726,898 | A | 3/1998 | Jacobs | |
| 5,748,485 | A * | 5/1998 | Christiansen et al. | 700/234 |
| 5,949,876 | A * | 9/1999 | Ginter et al. | 705/80 |
| 5,988,431 | A | 11/1999 | Roe | |
| 6,009,057 | A | 12/1999 | Furukawa et al. | |
| 6,026,374 | A * | 2/2000 | Chess | 705/26 |
| 6,118,450 | A | 9/2000 | Proehl et al. | |
| 6,123,020 | A | 9/2000 | Wolfer et al. | |
| 6,201,771 | B1 * | 3/2001 | Otsuka et al. | 369/30.32 |
| 6,243,328 | B1 | 6/2001 | Fenner et al. | |
| 6,327,230 | B1 | 12/2001 | Miller | |
| 6,327,236 | B2 | 12/2001 | Yamamiya | |
| 6,356,971 | B1 | 3/2002 | Katz et al. | |
| 6,587,031 | B1 * | 7/2003 | Daugherty et al. | 700/243 |
| 6,622,064 | B2 | 9/2003 | Bartholomew et al. | |
| 6,665,580 | B1 | 12/2003 | Susnjara | |
| 6,748,296 | B2 * | 6/2004 | Banerjee et al. | 700/241 |
| 6,997,375 | B1 | 2/2006 | Green et al. | |
| 7,027,383 | B2 | 4/2006 | Van Woudenberg | |
| 7,110,544 | B2 | 9/2006 | Gotoh et al. | |
| 7,221,643 | B2 | 5/2007 | Spruit et al. | |
| 7,234,609 | B2 | 6/2007 | DeLazzer | |
| 7,366,586 | B2 | 4/2008 | Kaplan et al. | |
| 7,503,494 | B2 | 3/2009 | Shimada et al. | |
| 7,844,547 | B2 * | 11/2010 | Amos | 705/43 |
| 2002/0046122 | A1 | 4/2002 | Barber | |
| 2004/0016620 | A1 | 1/2004 | Davis | |
| 2004/0044697 | A1 | 3/2004 | Nixon | |
| 2004/0099734 | A1 | 5/2004 | Barton | |
| 2004/0158871 | A1 | 8/2004 | Jacobson | |
| 2004/0162633 | A1 | 8/2004 | Kraft | |
| 2004/0254676 | A1 | 12/2004 | Blust | |
| 2005/0024996 | A1 | 2/2005 | Schumacher | |
| 2005/0096936 | A1 | 5/2005 | Lambers | |
| 2005/0192829 | A1 | 9/2005 | Zandt et al. | |
| 2005/0230410 | A1 | 10/2005 | DeLazzer et al. | |
| 2005/0240958 | A1 | 10/2005 | Nguyen | |
| 2006/0254862 | A1 | 11/2006 | Hoersten | |
| 2006/0259190 | A1 | 11/2006 | Hale | |
| 2006/0259191 | A1 | 11/2006 | Lowe | |
| 2006/0259192 | A1 | 11/2006 | Lowe | |
| 2006/0259262 | A1 | 11/2006 | Kuehnrich | |
| 2006/0260875 | A1 | 11/2006 | Hoersten | |
| 2006/0265101 | A1 | 11/2006 | Kaplan | |
| 2006/0272922 | A1 | 12/2006 | Hoersten | |
| 2007/0050266 | A1 | 3/2007 | Barber et al. | |
| 2007/0051802 | A1 | 3/2007 | Barber et al. | |
| 2007/0174140 | A1 | 7/2007 | Noonan | |
| 2007/0252003 | A1 | 11/2007 | Goldring et al. | |
| 2008/0114632 | A1 | 5/2008 | Partee et al. | |
| 2009/0073847 | A1 | 3/2009 | Chpakovski | |
| 2009/0276085 | A1 | 11/2009 | Rudy | |
| 2009/0276086 | A1 | 11/2009 | Rudy | |
| 2009/0276087 | A1 | 11/2009 | Murray et al. | |
| 2009/0326708 | A1 | 12/2009 | Rudy et al. | |

FOREIGN PATENT DOCUMENTS

| | | | |
|---|---|---|---|
| DE | 202004005215 | U1 | 7/2004 |
| DE | 202004005815 | U1 | 8/2005 |
| DE | 202004005818 | U1 | 8/2005 |
| EP | 2113891 | A1 | 11/2009 |
| JP | S59177759 | A | 10/1984 |
| JP | H02060948 | A | 3/1990 |
| JP | H02141893 | U | 11/1990 |
| JP | H05054510 | A | 3/1993 |
| JP | H0950665 | A | 2/1997 |
| JP | 2008040920 | A | 2/2008 |
| WO | WO0072160 | A1 | 11/2000 |

* cited by examiner

SYSTEM AND METHOD FOR REMOTELY BUYING, RENTING, AND/OR SELLING MEDIA DISCS

CROSS-REFERENCE TO RELATED APPLICATIONS

Not Applicable

STATEMENT REGARDING FEDERALLY SPONSORED RESEARCH

Not Applicable

REFERENCE TO MICROFICHE APPENDIX

Not Applicable

FIELD OF THE INVENTION

The field of the present invention generally relates to systems and methods for remotely handling media discs and, more particularly, a kiosk-based distribution system and method for remotely handling DVDs, CDs, video game discs, and the like.

BACKGROUND OF THE INVENTION

Consumers typically want their entertainment on demand. The movie and video game rental industry and the movie and video game sales industry have each been dominated by brick-and-mortar stores. These brick-and-mortar stores are generally successful at meeting demand by stocking large quantities of each new release and many older releases. In some instances, these stores also provide buy-back services where they buy used discs from consumers. While these brick and mortar stores may be somewhat successful, the store locations may not be convenient for all consumers.

Internet-based rental and sales services are also known. These rental services permit consumers to order videos via the internet and receive and return the videos via overnight couriers or other delivery services. Also, these sales services permit consumers to order videos via the internet and receive and return the videos via overnight couriers or other delivery services. While these internet based services may be somewhat successful, the consumers must wait at least one day until they receive the movies and/or games even if they are currently in stock.

Pay-per-view video services are also known. These services permit cable television and/or satellite television customers to select and immediately view a video. While these pay-per-view services are somewhat successful, these services offer only limited selections to viewers during any given period of time.

Remote dispensing machines or kiosks for DVDs are also known. These kiosks enable DVDs to be dispensed at locations convenient for consumers. To date, however, these machines are limited in the number of discs that can be stocked at any one time and thus may not have a movie or other digitally recorded entertainment that consumers demand when they demand it.

There is an ever increasing demand for consumers to obtain their entertainment as quickly and easily as possible. Accordingly, there is a need in the art for improved systems and methods for handling transactions involving media discs.

SUMMARY OF THE INVENTION

The present invention provides systems and methods for dispensing and receiving media discs which overcome at least some of the above-noted problems of the related art. Disclosed herein is a system for dispensing and receiving media discs comprising, in combination, a storage system for storing a plurality of the media discs, a dispense/receive system for dispensing the media discs to consumers and receiving media discs from customers, a disc identification system for identifying the media discs, a disc transfer system for moving the media discs between the dispense/receive system and the disc identification system, a control system operably connected to dispense/receive system to selectively intake media discs and operably connected to the disc transfer system to selectively activate the disc transfer system to move the media discs between the dispense/receive system to the disc identification system, and a user interface system operably connected to the control system and including a buy-back indicator which can be selectively activated by the customer. In response to activation of the buy-back indicator, the controller is adapted to activate the dispense/receive system to receive a media disc for buy-back, to activate the disc transfer system to move the media disc for buy-back from the dispense receive system to the disc identification system, to activate the disc identification system to identify the media disc for buy-back, to determine a buy-back price for the media disc for buy-back, and to activate the user interface system to inform the customer of the buy-back price.

Also disclosed herein is a system for dispensing and receiving media discs comprising, in combination, a storage system for storing a plurality of the media discs, a dispense/receive system for dispensing the media discs to consumers and receiving media discs from customers, a disc identification system for identifying the media discs, a disc transfer system for moving the media discs between the dispense/receive system and the disc identification system, a control system operably connected to dispense/receive system to selectively intake and dispense media discs and operably connected to the disc transfer system to selectively activate the disc transfer system to move the media discs between the dispense/receive system to the disc identification system, and a user interface system operably connected to the control system. The disc identification system includes an optical disc drive for reading prerecorded information on the media disc to identify the disc.

Also disclosed herein is a method for dispensing and receiving media discs comprising the steps of, in combination, providing a storage system for storing a plurality of the media discs, providing a dispense/receive system for dispensing the media discs to consumers and receiving media discs from customers, providing a disc identification system for identifying the media discs, providing a disc transfer system for moving the media discs between the dispense/receive system and the disc identification system, providing a control system operably connected to dispense/receive system to selectively intake media discs and operably connected to the disc transfer system to selectively activate the disc transfer system to move the media discs between the dispense/receive system to the disc identification system, and providing a user interface system operably connected to the control system and including a buy-back indicator which can be selectively activated by the customer. In response to activation of the buy-back indicator, the dispense/receive system is activated to receive a media disc for buy-back, the disc transfer system is activated to move the media disc for buy-back from the dispense/receive system to the disc identification system, the disc identification system is activated to identify the media disc for buy-back, a buy-back price for the media disc for buy-back is determined, and the user interface system is activated to inform the customer of the buy-back price.

From the foregoing disclosure and the following more detailed description of various preferred embodiments it will be apparent to those skilled in the art that the present invention provides a significant advance in the technology and art of systems and methods for remotely handling transactions involving media discs. Particularly significant in this regard is the potential the invention affords for remotely buying, selling and/or renting media discs. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein.

Figure 5:
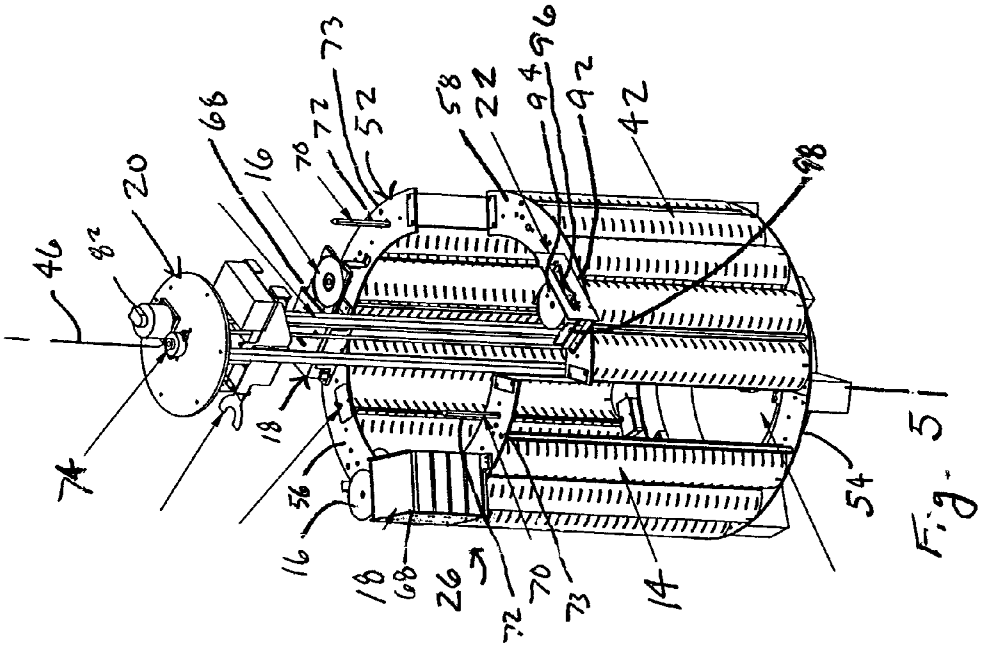
FIG. 5 is a perspective view of internal systems if the kiosk of FIGS. 1 to 4, wherein an exterior housing is removed for clarity.
Figure 1:
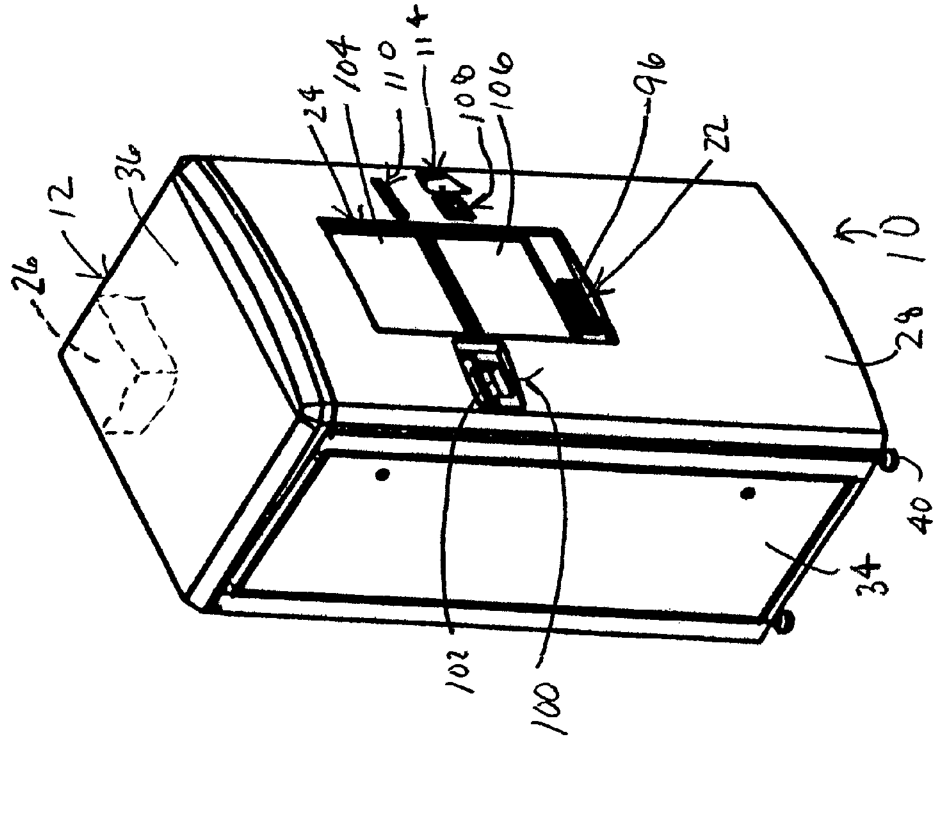
FIG. 1 is a perspective view of a kiosk for handling media discs according to the present invention.
Figure 4:
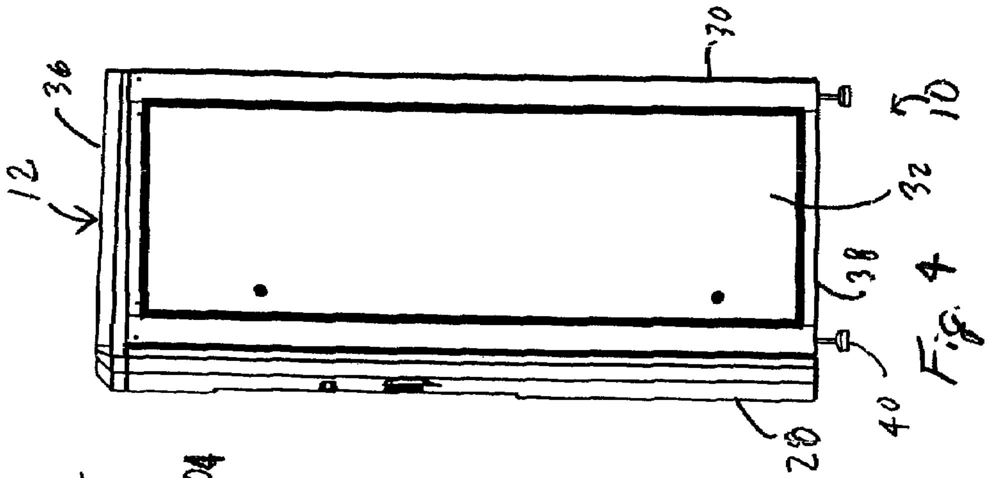
FIG. 4 is a left side view of the kiosk of FIGS. 1 to 3.
Figure 3:
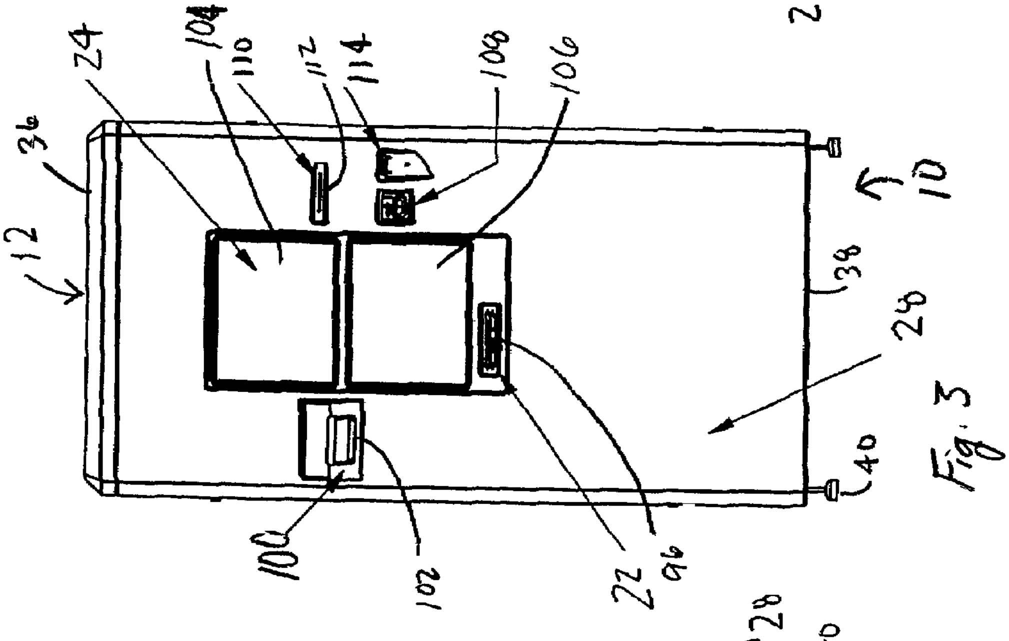
FIG. 3 is a front elevational view of the kiosk of FIGS. 1 and 2.
Figure 2:
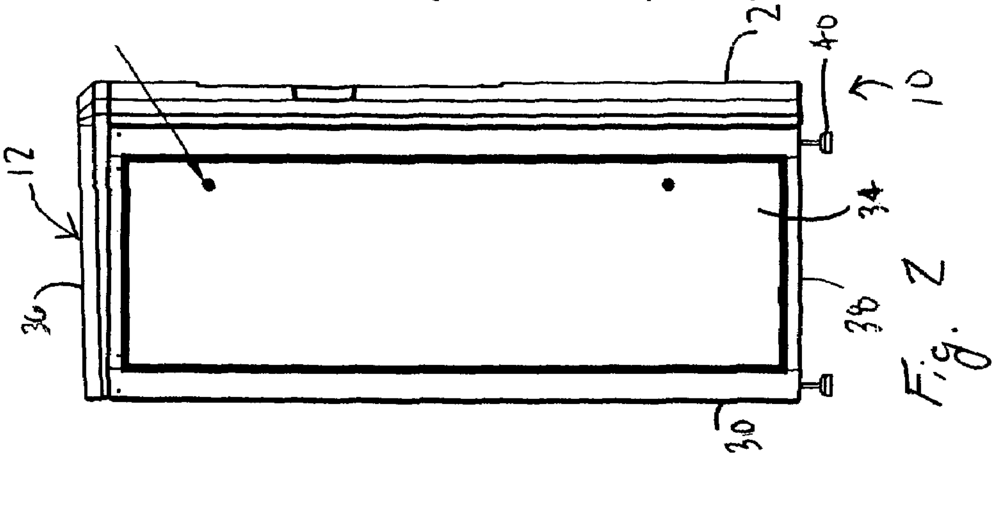
FIG. 2 is a right side elevational view of the kiosk of FIG. 1.

It should be understood that the appended drawings are not necessarily to scale, presenting a somewhat simplified representation of various preferred features illustrative of the basic principles of the invention. The specific design features of a machine or kiosk as disclosed herein, including, for example, specific dimensions, orientations, locations, and shapes will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the powered adjustable seat assembly illustrated in the drawings. In general, up or upward refers to an upward direction within the plane of the paper in FIG. 3 and down or downward refers to a downward direction within the plane of the paper in FIG. 3. Also in general, fore or forward refers to a direction out of the plane of the paper in FIG. 3 and aft or rearward refers to a direction into the plane of the paper in FIG. 3.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved systems and methods disclosed herein. The following detailed discussion of various alternative and preferred embodiments will illustrate the general principles of the invention with reference to a preferred embodiment of a system and method for dispensing prerecorded DVDs or other media discs. Other embodiments suitable for other applications will be apparent to those skilled in the art given the benefit of this disclosure.

In this specification and the claims, the term "media disc" is used to mean an optical storage format for digital information having a primary use of video, audio, and/or data storage such as, for example, a DVD (also known as a "Digital Versatile Disc" or a "Digital Video Disc") including but not limited to different embodiments such as DVD-R, DVD+R, DVD-RAM, DVD-RW and DVD+RW, and the like and also including but limited to different optical formats such as SD DVD, HD DVD, BLU-RAY DVD, and the like, a CD (also known as a "Compact Disc") including but not limited to CD-ROM, CD-R, CD-RW, SACD, VCD, SVCD, PhotoCD, Picture CD, CDi, Enhanced CD, and the like, and other like discs. A typical media disc is used to store media such as, movies, music, video games, software, or the like. By way of example, a standard CD is a disc of almost pure polycarbonate plastic, having a diameter of about 120 mm and a thickness of about 1.2 mm. Mini CDs have diameters ranging from about 60 to about 80 mm. Media discs typically have a circular outer edge and a concentric center opening. In this specification and the claims, the term "prerecorded media disc" is used to mean a media disc that has already been recorded with information such that it operates as read only memory (ROM). In this specification and the claims, the term "uncovered media disc" is used to mean a media disc that is not located in a protective case, cover, sleeve or the like such that it is in a condition to be directly inserted into a standard optical disc drive (ODD) for reading.

Referring now to the drawings, FIGS. 1 to 5 illustrate a machine or kiosk 10 for remotely buying, renting, returning, and/or selling media discs according to a preferred embodiment of the present invention. In this specification and the claims, the terms "buy" and "buy-back" are used to mean the purchase of a media disc 16 by the kiosk 10 from a customer regardless of where the customer originally obtained the media disc 16. In this specification and the claims, the term "rent" is used to mean a media disc 16 is loaned to the customer from the kiosk 10 for a period of time in consideration of a rental payment to the kiosk 10. In this specification and the claims, the term "return" is used to mean a media disc 16 that is brought to the kiosk 10 by a customer that was previously rented. In this specification and the claims, the term "sell" is used to mean the purchase of a new or used media disc 16 by a customer from the kiosk 10. The illustrated kiosk 10 includes a cabinet or enclosure 12, a disc storage system 14 located within the enclosure 12 for storing a plurality of prerecorded media discs 16, a disc identification system 18 for identifying the prerecorded media discs 16, a disc transfer system 20 for moving the media discs 16 between desired locations within the enclosure 12, a disc dispense/receive system 22 for dispensing media discs 16 from the enclosure 12 to consumers and receiving media discs 16 into the enclosure 12 from consumers, a user interface system 24 for interfacing between a consumer and the kiosk 10, and a control system 26 for automatically operating the various systems of the kiosk 10.

The illustrated enclosure 12 is generally rectangular shaped having opposed front and back sides 28, 30, and opposed left and right sides 32, 34 connecting the front and back sides 28, 30. The illustrated enclosure 12 also includes a top end 36 and a bottom end 38. The illustrated front side 28 is provided with portions of the user interface system 24 as described in more detail hereinafter. The illustrated bottom end 38 is provided with a support structure having a plurality of adjustable feet or supports 40 so that the enclosure 12 can be adjusted to be substantially level. The illustrated sides 28, 30, 32, 34, 34, 36 form a hollow interior cavity for protecting the various systems and components as described in more detail hereinafter.

The illustrated disc storage system 14 includes a storage unit or drum 42 located within the enclosure 12. The storage unit 42 includes a plurality of horizontally disposed trays or shelves 44 (best shown in FIGS. 6 to 8) sized and shaped to support the uncovered media discs 16. The illustrated shelves 44 are sized and shaped to each hold a plurality of uncovered media discs 16 vertically stacked one upon the other. The illustrated storage unit 42 is generally cylindrical or drum shaped have a vertically extending central longitudinal axis 46. The illustrated shelves 44 collectively encircle the central longitudinal axis 46. The illustrated shelves 44 are each closed at an outer side in the radial direction and open on an inner side in the radial direction so that the media discs 16 are inserted and removed from the shelves 44 within the storage unit 42 in a radial direction.

Figure 8:
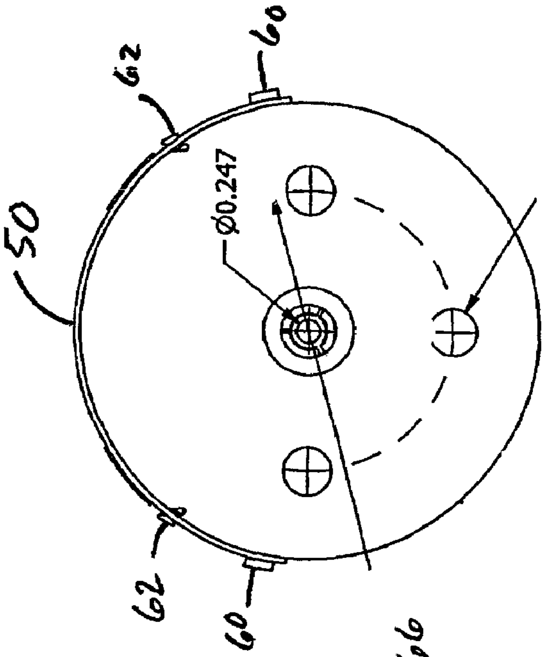
FIG. 8 is a top plan view of the single segment of the storage drum of FIG. 6.
Figure 7:
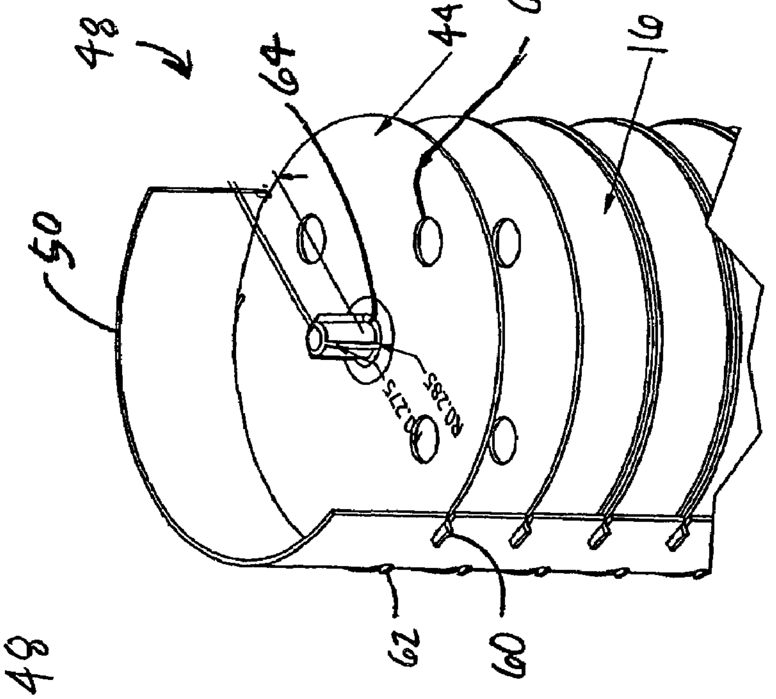
FIG. 7 is an enlarged fractional view taken along line 7-7 of FIG. 6.
Figure 6:
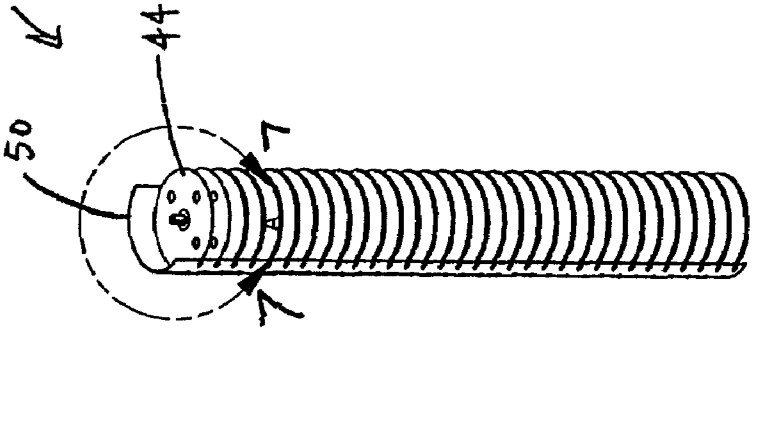
FIG. 6 is a perspective view of a single segment of a storage drum of the kiosk of FIGS. 1 to 5.

As best shown in FIGS. 6 to 8, the illustrated storage unit 42 is formed by a plurality of storage segments 48. The illustrated storage unit 42 includes seventeen of the segments 48 but any other suitable number can alternatively be utilized. The segments 48 are located side-by-side about the central axis 46 to fully encircle the central axis 46. Each illustrated segment 48 includes a partial tube 50 and a plurality of the shelves 44 supported by the tube 50 and located one above the other. The illustrated storage unit 42 includes five short tubes 50*a* located at the front of the enclosure 12 and twelve tall tubes 50*b* but it is noted that any other suitable quantity and configuration of tubes 50 can alternatively be utilized. The illustrated tubes 50 are formed of rolled sheet metal but alternatively can be formed in any other suitable manner and/or formed of any other suitable material. The segments 48 are supported by top and bottom rings 52, 54. The segments 48 can be secured to the rings 52, 54 in any suitable manner and the lower bottom ring is secured to the enclosure 12 so that the disc storage unit 42 is stationary within the enclosure 12. Preferably, the short tubes 50*a* are removably secured so that they can be selectively removed to provide access to the interior of the storage unit 42. The illustrated upper ring 52 comprises two segments to account for the short tubes 50*a* and forms first and second shelves 56, 58 for supporting components as described in more detail herein after. The illustrated rings 52, 54 are formed of metal but alternatively can be formed of any other suitable material.

Each illustrated shelf 44 includes a generally horizontal wall which is circular shaped and sized to hold the media discs 16. Each illustrated shelf 44 also includes a pair of tabs 60 that engage slots in the edges of the tube 50 and a pair of snap-locks 62 which engage spaced-apart slots in the tube 50. It is noted that the shelves 44 can alternatively be secured to the tubes 50 in any other suitable manner. Each illustrated self 44 is also provided with a center post 64 which extends into the central openings of the media discs 16 stacked on the shelf 44. Openings 66 are provided in each shelf 44 to cooperate with the disc transfer system 20 as described in more detail hereinafter. The illustrated shelves 44 are molded of a plastic material such as, for example, nylon. It is noted that the shelves 44 can alternatively comprise any other suitable material such as, for example, metal or the like and can alternatively be formed in any other suitable manner such as, for example, stamping or the like.

Each illustrated short tube 50*a* supports twenty shelves 44 for holding a single stack of up to ten of the uncovered media discs 16. Each illustrated tall tube 50*b* supports twenty seven shelves 44 for holding a single stack of up to ten of the uncovered media discs 16. Thus the illustrated storage unit 42 includes four hundred and twenty four of the shelves for a storage capacity of four thousand two hundred and forty of the uncovered media discs 16. It is noted that any other suitable quantity of segments 48, shelves 44 per segment 48, and/or media discs 16 per shelf 44 can alternatively be utilized. It is also noted that the storage unit 42 can alternatively be formed in any other suitable manner.

The illustrated disc identification system 18 includes an optical disc drive (ODD) or reader 68 for reading data recorded on the prerecorded media discs 16. When a prerecorded media disc 16 is inserted into the optical disc drive 68, the optical disc drive 68 is activated to read data recorded on the disc 16 which can be used to identify the media disc 16. The optical disc drive 68 is in communication with the control system 26 to provide the identity of the media disc 16. The optical disc drive 68 can be of any suitable type for reading the media discs 16. It is noted that more than one optical disc drive 68 can be provided and/or more than one type of optical disc drive 68 can be provided. For example, at least one DVD drive and at least one game CD drive may be needed if the kiosk is adapted to dispense both DVDs and/or game CDs so the kiosk can dispense movies, video games, and/or software. Also for example, at least one SD DVD drive and at least one HD DVD drive may be needed if the kiosk is adapted to dispense both standard definition and high definition DVDs. The illustrated kiosk 10 has five DVD optical disc drives 68 any other suitable quantity and/or type can alternatively be utilized. The illustrated optical disc drives 68 are located on the first shelf 56 so that they are accessible by the disc transfer system 20 as described in more detail hereinafter. It is noted that any other suitable disc identification system 18 can be additionally or alternatively utilized such as, for example, a bar code reader, magnetic strip reader or the like can be utilized to read labels secured to the prerecorded media discs 16.

The illustrated first shelf 56 is also provided with two disc holding or load/unload locations or stations 70. It is noted that alternatively a greater or lesser of load/unload stations 70 can alternatively be utilized. Each load/unload station 70 is adapted for temporarily holding a stack of the uncovered media discs 16. The illustrated load/unload stations 70 each have a vertically extending center post or spindle 72 to cooperate with the central openings of the media discs 16. Openings 73 are provided in the first shelf 56 about the spindles 72 to cooperate with the disc transfer system 20 as described in more detail hereinafter. It is noted that load/unload stations 70 can alternatively have any other suitable configuration. Configured in this manner, the inventory of the kiosk 10 can be serviced by removing stacks of the uncovered media discs 16 from the load/unload stations 70 through an access door in the front side 28 of the kiosk 10. Likewise, the inventory of the kiosk 10 can be serviced by inserting stacks of the uncovered media discs 16 into load/unload stations 70 through the access door in the back side 28 of the kiosk 10.

The illustrated disc transfer system 20 includes a three-axis transfer device or robot 74 for transferring media discs 16 between the load/unload stations 70, the optical disc drives 68 of the disc identification system 18, the shelves 44 of the storage system 14, and the disc dispense/receive system 22. The transfer device 74 is in operable communication with the control system 26 to locate each media disc 16. It is noted that the disc transfer system 20 can alternatively have any other suitable configuration.

Figure 10:
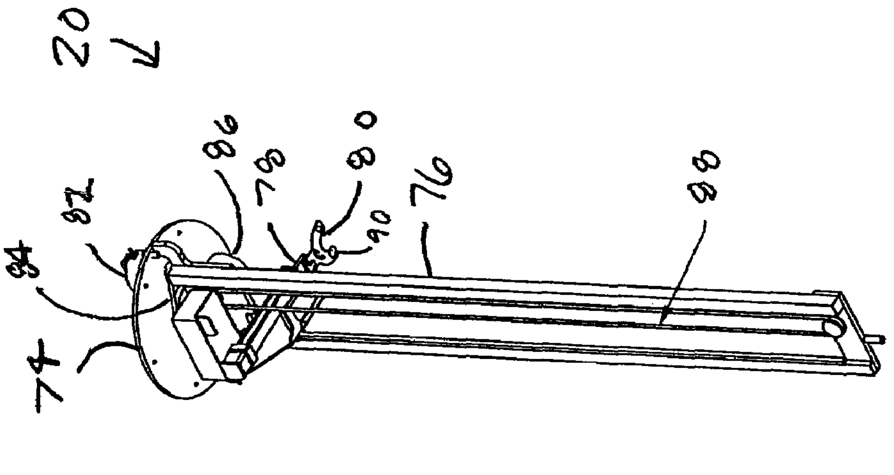
FIG. 10 is another perspective view of the disc transfer system of the kiosk of FIGS. 1 to 5, but wherein the pick-up head is located in a top and retracted position.
Figure 9:
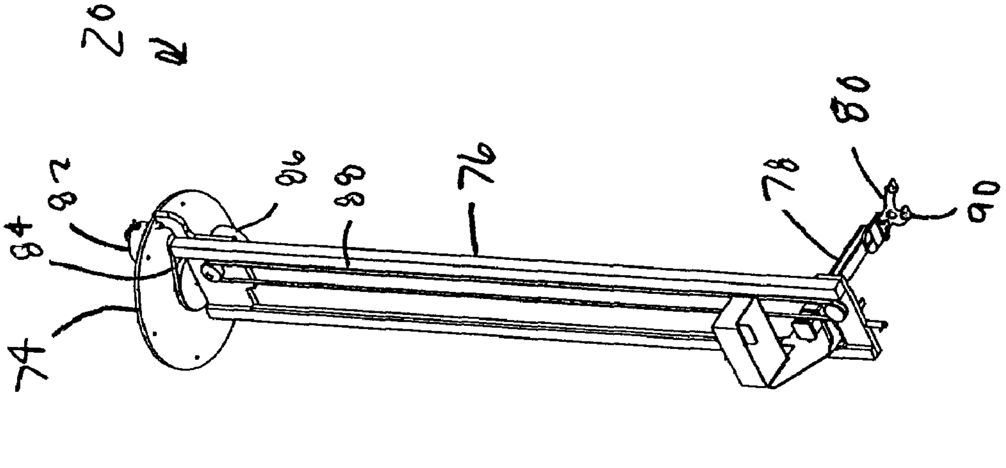
FIG. 9 is a perspective view of a disc transfer system of the kiosk of FIGS. 1 to 5, wherein a pick-up head is located in a bottom and extended position.

The illustrated transfer device or means 74 includes a vertically extending and rotatable support or rail 76, a horizontally disposed arm or carrier 78 vertically movable along the rail 76, and a gripper or pick-up head 80 secured to the arm 78 and movable toward and away from the rail 76. Configured in this manner the pick-up head 80 can be selectively moved in three dimensions to any desired location. The illustrated rail 76 is centrally located within the enclosure and located at the axis 46 of the storage unit 42. The illustrated rail 76 extends from the top end 36 to the bottom end 38 of the enclosure 12. The rail 76 is operably connected to a suitable electric motor 82 by a transmission belt 84 which selectively pivots the rail 76 on the vertically extending central axis 46. It is noted that the rail 76 can alternatively have any other suitable configuration. The illustrated arm 78 is supported by the rail 76. The arm is operably connected to a suitable electric motor 86 by a transmission belt 88 which selectively moves the arm 78 along the length of the rail 76. The illustrated arm is horizontally extendable between a retracted position (best shown in FIG. 10) and an extended position (best shown in FIG. 9). The arm can be provided with any suitable type of linear actuator for selectively moving the arm 78 between its retracted and extended positions. It is noted that the arm 78 can alternatively have any other suitable configuration. The pick-up head 80 can be of any suitable type to selectively grab and release a media disc 16 located either on the top of a stack of the media discs 16 or directly on the top of a shelf 44.

It is noted that the illustrated pick-up head 80 can grab a media disc 16 having limited access above the disc. For example, the pick-up head 80 can grab a media disc 16 located the top of a stack of discs located on one of the shelves 44 of the storage unit 42. Preferably, the pick-up head 80 can grab a media disc 16 having an overhead clearance space of no more than ¼" and no underneath clearance. The illustrated pick-up head 80 can grab a media disc 16 having a overhead clearance of only ⅛" and no underneath clearance. The illustrated pick-up head 80 is in the form of a generally flat and thin spatula having a plurality of vacuum ports 90 located at the under side thereof. The illustrated pick-up head 80 has three vacuum ports 90 but any other suitable quantity can alternatively be utilized. The pick-up head 80 is preferably provided with upward and downward load sensors to assist in operation of the pick-up head 80. A vacuum pump and load sensors are secured to the arm 78. To pick up a media disc, the arm 78 is extended to position the spatula pick-up head 80 over the media disc 16 and the arm 78 is lowered until all of the ports 90 engage the media disc 16 to form a vacuum to secure the media disc 16 to the pick-up head 80. It is noted that a vacuum is not formed unless all of the ports 90 engage the media disc 16. The arm 78 can then be raised with the media disc 16 held thereto by suction at the vacuum ports 90 and the media disc 16 is moved to its desired location and released by releasing the vacuum therebetween. It is noted that openings 66, 73 are provided at the disc pick-up locations that cooperate with the vacuum ports 90 so that a vacuum is not formed if a media disc 16 is not located at the pick-up located.

The product delivery or disc dispense/receive system 22 is adapted for selectively dispensing uncovered media discs 16 from inside the enclosure 12 to consumers located outside the enclosure 12 and receiving uncovered media discs 16 into the enclosure 12 from consumers located outside the enclosure 12. The illustrated dispense/receive system 22 includes a transfer device 92 having a transfer station 94 for holding a horizontally disposed, uncovered media disc 16 to be transferred, a transfer slot 96 located at the front side of the enclosure 12 and adjacent the transfer station 94, and a moving or push-pull mechanism 98 for selectively pushing the media disc 16 at the transfer station 94 through the transfer slot 96 to the consumer and selectively pulling a media disc 16 from the consumer through the transfer slot 96 to the transfer station 94. The illustrated transfer device 92 is mounted on the second shelf 58 but can alternatively be mounted in any other suitable location. The transfer slot 96 is preferably a gated opening. The push-pull mechanism 98 can include a pair of opposed flat belts which pull the media disc 16 in by its edges and round belts located beneath the media disc 16 which further convey the media disc 16 to the transfer station 94. The user interface system 24 prompts the consumer to receive an uncovered media disc 16 from the transfer slot 96 when the consumer buys or rents a media disc 16 from the kiosk 10 and to insert an uncovered media disc 16 into the transfer slot 96 when the consumer sells back or returns a rented media disc 16 to the kiosk 10. It is noted that the dispense/receive system 22 can alternatively be of any other suitable type.

The illustrated kiosk 10 also includes a cover dispensing system 100 which selectively dispenses protective covers for the media discs 16 from the enclosure 12 through a horizontally extending slot 102 when the consumer receives an uncovered media disc 16 so that the consumer can insert the uncovered media disc 16 into the protective cover. The protective cover can be of any suitable type. Preferably, the protective sleeve is an envelope sized and shaped to closely receive a single media disc and which is printed in real time with transaction information such as, for example, a unique bar code identifying the transaction. The bar code can be later used by the consumer to speed later transactions such as returning a defective purchased media disc 16 or returning a rented media disc 16. The envelope can also be printed with promotional advertising and/or promo codes. The envelope can be further printed with information as to where the media disc 16 can be returned. Moreover, the envelope can be provided with a return mailing address and postage so that the consumer can return by mail media discs 16 rented from the kiosk 10. Preferably, a fan-folded stack of envelopes connected by perforations or the like is located within the enclosure 12 which is fed to a printer and then to the slot 102. It is noted that the cover dispensing device 100 can alternatively be of any other suitable type.

The illustrated user interface system 24 includes a pair of touch video screens 104, 106 located one above the other and an audio system wherein audio visual information can be presented to the customer and the customer can input information to the control system 26 by touching the screens 104, 106 at indicated positions and times. Preferably, one of the two touch screens 104, 106 continuously displays advertisements, trailers, and the like while the other of the two touch screens 104, 106 is used to transact with the customer. Preferably the customers can switch the functions of the two screens 104, 106 which will accommodate tall and short and handicapped persons. The illustrated user interface system 24 also includes a magnetic card reader 108 suitable for reading standard credit and debit cards of the consumer. The illustrated card reader 108 is located adjacent the touch video screens 104, 106 but can alternatively be at any other suitable location. The illustrated user interface system 24 also includes a receipt printer 110 that prints and dispenses a transaction receipt to the consumer through a horizontal receipt slot 112 in the enclosure 12. The receipts printed with transaction information and is preferably provided with a unique bar code identifying the transaction. The illustrated receipt printer 110 is located adjacent the touch video screens 104, 106 but can alternatively be at any other suitable location. The illustrated user interface system 24 also includes a bar code scanner 114 suitable for reading bar codes located on media discs 16, protective sleeves, and/or transaction receipts. The illustrated bar code scanner 114 is located adjacent the touch video screens 104, 106 but can alternatively be at any other suitable location. It is noted that the user interface system 24 can alternatively have any other suitable configuration.

The illustrated control system 26 includes suitable memory means, processing means and communication means for operating the various systems and components of the kiosk 10 in the desired manner. The illustrated control system 26 is operably connected to the optical disc drives 68 of the disc identification system 18, the transfer device 74 of the disc transfer system 20, the transfer device 92 of the disc dispense/receive system 22, the cover dispensing system 100, and the touch video screens 104, 106, the audio system, the magnetic card reader 108, the receipt printer 110, and the bar code reader 114 of the user interface system 24.

To load the kiosk 10 with media discs 16, a desired quantity of uncovered media discs 16 are stacked onto the spindles 72 of the load/unload stations 70. The controller 26 activates the transfer device 74 to pick up one of the media discs 16 from one of the load/unload stations 70 and moves the media disc 16 to one of the optical disc drives 68. The transfer system moves the media disc 16 to other disc drives 68 if needed until, a disc drive is located which can read the media disc 16. Once the media disc 16 is in the correct optical disc drive 68, the controller 26 activates the disc drive 68 so that the disc drive 68 reads at least a portion of the prerecorded information on the media disc 16 to provide the controller 26 with the identification of the media disc 16. The controller 26 activates the transfer device 74 to pick up the media disc 16 from the optical disc drive 68 and to move the media disc 16 to a desired location in the storage unit 42. The controller 26 stores in memory the location of the media disc 16 in the storage unit 42 for later dispensing or removal. The above process is continued until each of the loaded media discs 16 are identified and stored in the storage unit 42. Whenever it is desired to remove media discs 16 from the kiosk 10, the process is reversed to move desired media discs 16 from the storage unit 42 to the load/unload stations 70.

Figure 11:
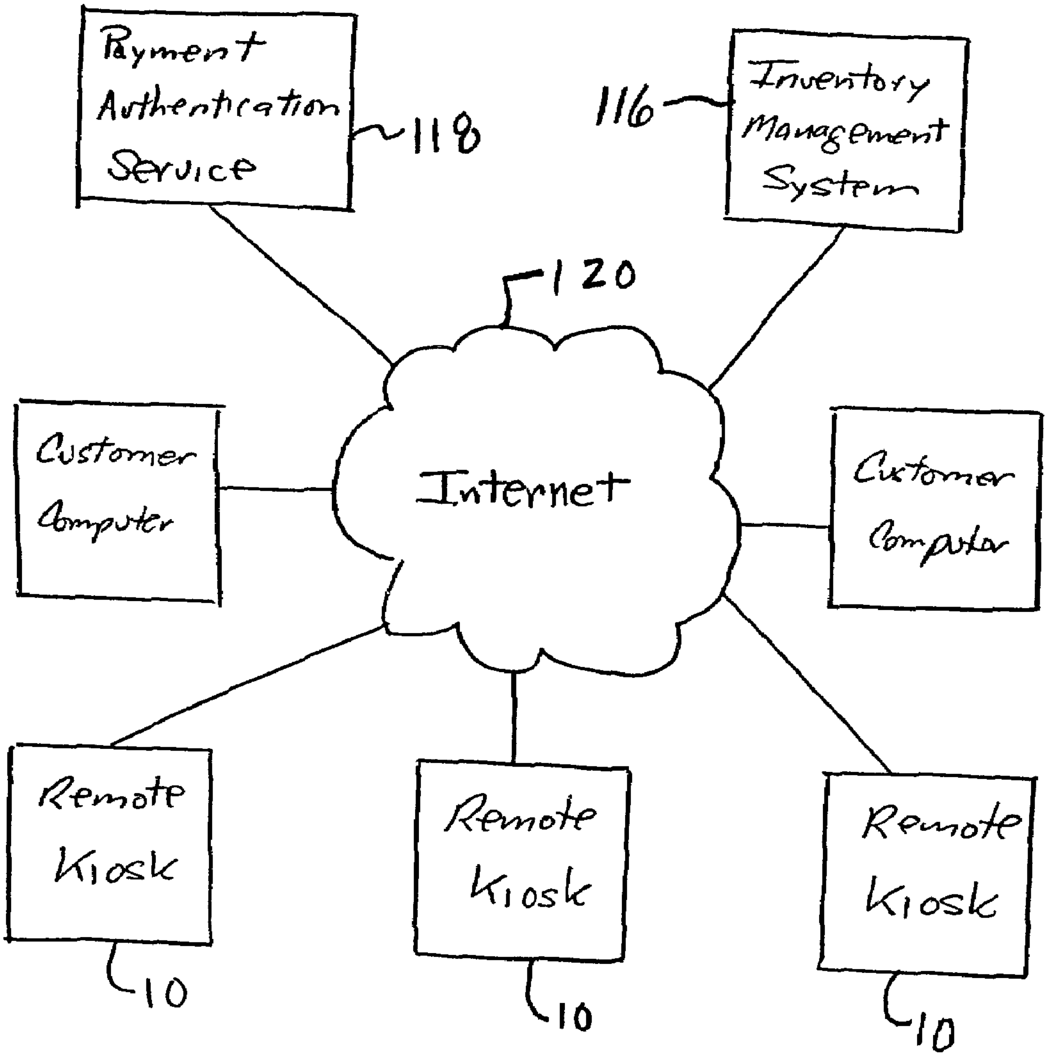
FIG. 11 is schematic view of a distribution system of the kiosks of FIGS. 1 to 10.

As best shown in FIG. 11, the control system 26 of the kiosk 10 is also in communication with a central inventory management system 116 and a payment authentication service 118 via the Internet 120. It is noted that the communication can alternatively be by any other suitable means such as, the public switched telephone network, an intranet, or the like. The central inventory management system 116 automatically tracks and coordinates the inventory of the media discs 16 and transactions of the kiosks 10 in the distribution system. The inventory management system 116 is operably connected to the disc transfer system 20 of each kiosk 10 to selectively activate the disc transfer system 20 to move selected ones of the media discs from the disc storage system 14 to the load/unload stations 70 located outside the disc storage system 14 but within the kiosk 10 for manual removal from the kiosk 10. Once the kiosk 10 transfers and stacks the selected media discs 16 at the load/unload stations 70, an employee or agent etc. goes to the kiosk 10 to retrieve the selected discs 16 from the load/unload stations through the access door. The selected discs are taken to a central location and resorted so that they can be manually taken back to selected kiosks 10 to redistribute the media discs 16 among the kiosks 10. The media discs 16 are loaded into the kiosks 10 as described hereinabove. The inventory management system 116 is operably connected to each of the kiosks 10 to automatically activate transfer of selected media discs 16 between the kiosks 10 based on predetermined conditions such as transaction histories among the kiosks 10 and/or inventory levels among the kiosks 10. The inventory management system 116 is programmed to automatically determine which media discs 16 need to be removed from the kiosks 10 and automatically directs the kiosks 10 to stack them up for manual removal. The inventory management system 116 reviews current inventory levels among the kiosks 10, determines the desired distribution among the kiosks 10 and then initates the transfer of media discs to obtain the desired distribution among the kiosks 10. The desired distribution places media discs 16 at locations which are most likely to give a positive return on investments. The inventory management system 116 determines which media discs 16 should be pulled from a kiosk 10 because the return on investment is less likely to be positive at that kiosk 10 than at another kiosk 10. Thus the inventory management system 116 looks at where all the media discs 16 in the system are located and where they should be and initiates transfer to get the discs where they should be for maximized return. For example, if kiosk A has too many copies of a DVD of Pirates II (there is a large quantity and/or a history of a low number of transactions for that particular DVD) and kiosk B does not have enough copies of the DVD of Pirates II (there is a low quantity of that particular DVD and/or a history of a high number of transactions for that particular DVD), the inventory management system 136 automatically initiates the transfer of a copy or copies of Pirates II from kiosk A to kiosk B. The payment authentication service 118 enables the kiosks 10 to authenticate the credit and debit cards of the consumers during transactions in a known manner.

When a customer desires the kiosk to buy, rent, return, or sell a media disc 16 the customer interacts with the touch video screens 104, 106 to select a desired type of transaction. If the customer is a prior customer they can log into the kiosk system by swiping a credit or debit card in the magnetic card reader 108 or scanning a barcode located on a prior transaction receipt or protective cover into the bar code scanner 114.

If the customer desires to the kiosk 10 sell or rent a media disc 16, the customer interacts with the kiosk browser to search for desired media discs 16 that are available in the kiosk 10. The customer can preferably search by title, actor/actress, director, etc. Once the customer selects a desired media disc or discs 16 and indicates that they want to purchase the media disc or discs, the controller 26 instructs the customer via the video screens 104, 106 to swipe a credit or debit card in the magnetic card reader 108 if the customer is not a prior customer or the customer has not already logged into the system. Once the card is swiped and the customer indicates they want to finalize the transaction, the controller 26 obtains authorization for the transaction from the payment authorization service. If the transaction is authorized, the controller 26 activates the transfer device 74 to retrieve the selected media disc 16 from the storage unit 42 and to deposit the media disc 16 at the transfer station 94. The controller 26 then activates the push/pull mechanism 98 to push the media disc 16 through the transfer slot 96 to the customer. The controller 26 also activates the receipt printer 110 to print a receipt of the transaction and dispense the receipt through the receipt slot 112 to the customer. The controller 26 further activates the cover dispensing system 100 to dispense a protective cover through the cover slot 102 to the customer. The customer can then pick-up the receipt, protective sleeve, and the media disc 16 and insert the media disc 16 into the protective cover.

Figure 12:
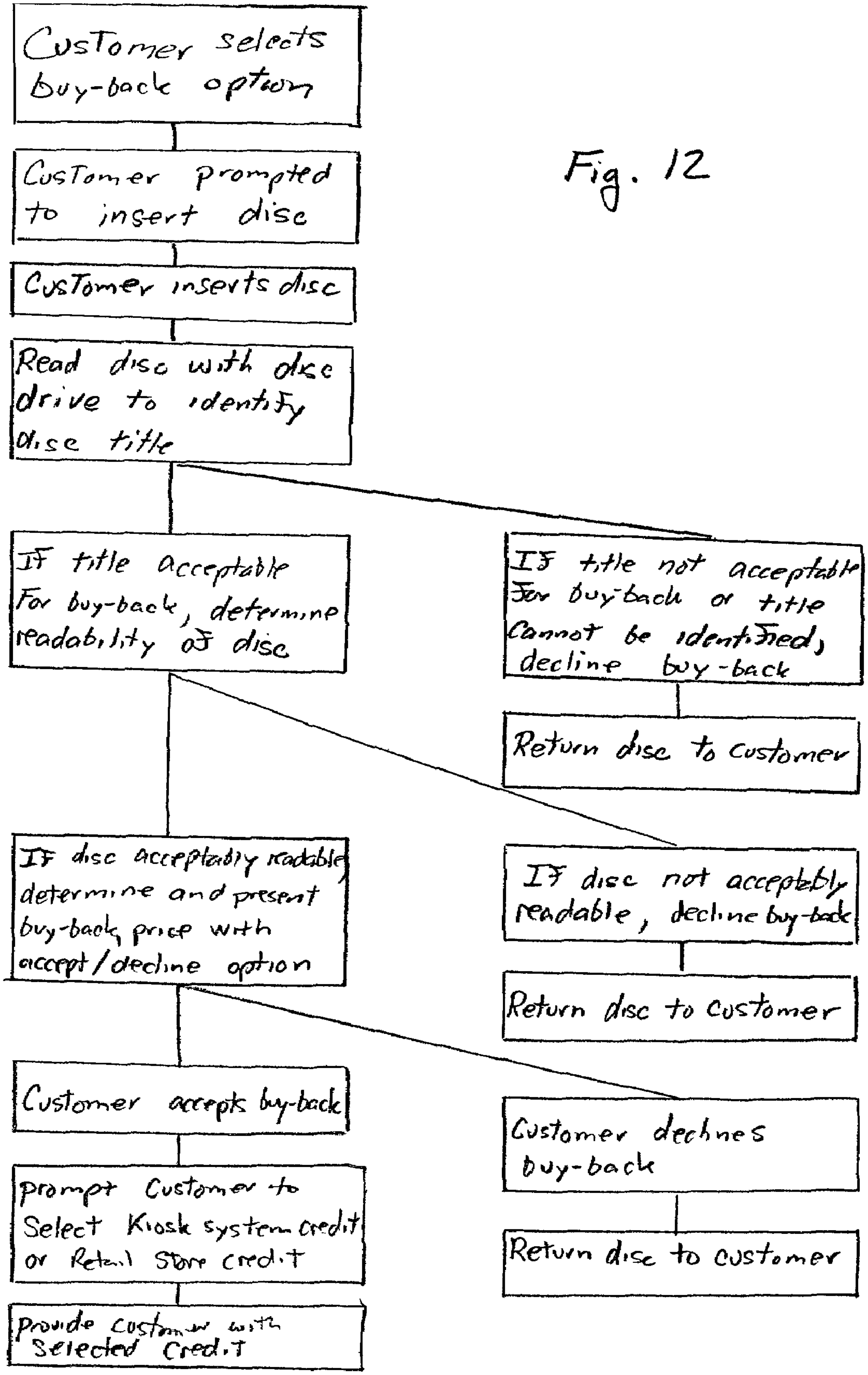
FIG. 12 is a flow chart showing a buy-back process for the kiosks of FIGS. 1 to 10.

If the customer desires to use the kiosk 10 to return a previously rented media disc 16, the customer can log into the system by swiping a credit or debit card in the magnetic card reader 108 or scanning a barcode located on a prior transaction receipt or protective cover into the bar code scanner 114. The controller 26 will then display to the customer the media disc 16 to be returned for verification by the customer. The customer verifies the correct media disc 16 being returned by touching the appropriate location on the screen 104, 106, and the controller 26 prompts the customer to insert the media disc 16 into the transfer slot 96 and activates the push/pull mechanism 98. When the customer inserts the media disc 16 into the transfer slot 96, the push/pull mechanism 98 pulls the media disc 16 to the transfer station 94 and the controller 26 activates the transfer device 74 to move the media disc 16 to the optical disc drive 68. Once in the disc drive 68, the controller 26 activates the disc drive 68 to verify that the correct media disc 16 was inserted by the customer. If the media disc 16 is verified, the controller 26 indicates to the customer that the return is complete. If the media disc 16 is not the media disc 16 that the controller 26 expected to be inserted into the kiosk 10, the media disc 16 is returned to the customer and the controller 26 prompts the customer to insert the correct media disc 16. The process is continued until the return is completed or the customer abandons the process. It is noted that the media disk 16 being returned can be a media disk 16 rented from the same kiosk 10, a different kiosk 10 in the system, or a brick-and-mortar store affiliated with the kiosk system. It is also noted that rented media discs 16 can alternatively be returned in other manners such as mailed in a preaddressed, postage paid envelope provided at the time of rental or return to a brick-and-mortar store affiliated with the kiosk system If the customer desires the kiosk 10 to buy or buy back a media disc 16, the customer must indicate the type of transaction to the kiosk 10. FIG. 12 illustrates an buy-back procedure in which the kiosk 10 will buy a media disc 16 from a customer. When the customer selects the buy-back option, the controller 26 prompts the customer to insert the media disc 16 for buy-back into the transfer slot 96 and activates the push/pull mechanism 98. When the customer inserts the media disc 16 into the transfer slot 96, the push/pull mechanism 98 pulls the media disc 16 to the transfer station 94 and the controller 26 activates the transfer device 74 to move the media disc 16 to the optical disc drive 68. Once in the disc drive 68, the controller 26 activates the disc drive 68 to read the media disc 16 to identify the title of the media disc 16 inserted by the customer. If the title of the media disc 16 is not identifiable or the media disc 16 is not acceptable for buy-back (for example not of a suitable type, not suitable for sale or rent, or too many of the title already in the kiosk system), the controller 26 indicates to the customer that the buy back is declined and returns the media disc 16 to the customer. If the title of the media disc 16 is identified as acceptable for buy-back (for example of a suitable type, suitable for sale or rent, or not too many of the title already in the kiosk system), the controller 26 activates the disc drive 68 to determine the quality of readability or playability of the media disc 16. The quality of readability playability of the media disc 16 can be measured in any suitable manner such as, for example, commercially available software and/or hardware solutions. The determination of the quality of readability or playability enables the playability of the media disc 16 to be guaranteed in future rentals and/or sale. If the quality of readability or playability of the media disc 16 is not acceptable, that is, it is not at a predetermined allowable level (for example the errors or error rate is below a predetermined allowable number of errors or error rate), the controller 26 indicates to the customer that the buy back is declined and returns the media disc 16 to the customer. If the quality of readability or playability of the media disc 16 is acceptable, that is at a predetermined allowable level (for example the errors or error rate is below a predetermined number of errors or error rate), the controller 26 indicates to the customer that the buy back is accepted and determines the buy-back price for the media disc 16. The buy back price can be determined in any suitable manner such as, for example, looked up in a table of current market prices for media discs 16. The controller 26 then displays the buy back price to the customer and prompts the customer to accept or decline the buy back price. If the customer declines the buy-back price, the controller returns the media disc 16 to the customer. If the customer accepts the buy back price for the media disc 16, the controller 26 prompts the customer to select the type of credit that the customer desires in payment for the media disc 16. The types of credit can include credit for use in the kiosk system, credit in retail store in which the kiosk is located, credit at another store retail store, or any other suitable credit. Once the customer selects the desired type of credit, the controller 26 activates the receipt printer 110 to print a receipt of the transaction and dispenses it to the customer. If the customer selected a retail store credit, the receipt can include a coupon for use in the retail store.

Figure 13:
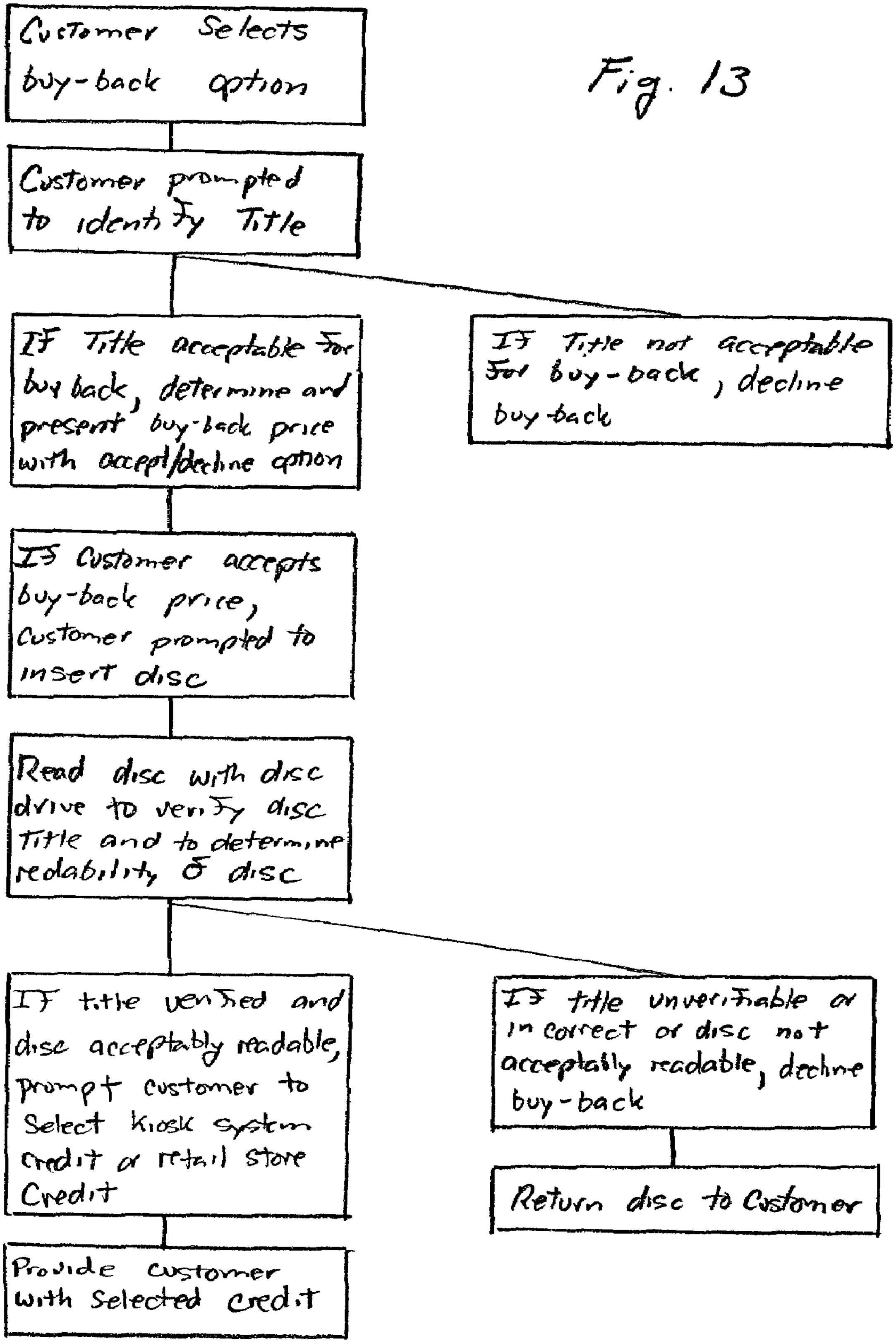
FIG. 13 is a flow chart showing an alternative buy-back process for the kiosks of FIGS. 1 to 10.

FIG. 13 illustrates an alternative buy-back procedure in which the kiosk 10 will buy a media disc 16 from a customer. This buy-back procedure is similar to the process described above but is believed to be less time consuming because the buy-back price is presented to the customer earlier in the process and thus permits the process to be terminated much earlier if the customer finds the buy back price unacceptable. When the customer selects the buy-back option, the controller 26 prompts the customer to identify the title of the media disc 16 for buy back. The title of the media disc can be identified in any suitable manner such as, for example, typing in the title, selecting the title from a list, or scanning a bar code on the protective cover. If the title of the media disc 16 is not acceptable for buy-back (for example not of a suitable type, not suitable for sale or rent, or too many of the title already in the kiosk system), the controller 26 indicates to the customer that the buy back is declined. If the title of the media disc 16 is identified as acceptable for buy-back (for example of a suitable type, suitable for sale or rent, or not too many of the title already in the kiosk system), the controller 26 determines the buy-back price for the media disc 16. The buy back price can be determined in any suitable manner such as, for example, looked up in a table of current market prices for media discs 16. The controller 26 then displays the buy back price to the customer and prompts the customer to accept or decline the buy back price. If the customer declines the buy-back price, the controller 26 terminates the buy-back process. If the customer accepts the buy back price for the media disc 16, the controller 26 prompts the customer to insert the media disc 16 for buy-back into the transfer slot 96 and activates the push/pull mechanism 98. When the customer inserts the media disc 16 into the transfer slot 96, the push/pull mechanism 98 pulls the media disc 16 to the transfer station 94 and the controller 26 activates the transfer device 74 to move the media disc 16 to the optical disc drive 68. Once in the disc drive 68, the controller 26 activates the disc drive 68 to read the media disc 16 to identify the title of the media disc 16 inserted by the customer. If the title of the media disc is not verifiable or is not the media disc 16 identified for buy-back, the controller 26 indicates such to the customer and returns the media disc 16 to the customer. If the title of the media disc 16 is verified as the title identified for buy-back, the controller 26 activates the disc drive 68 to determine the quality of readability or playability of the media disc 16. The quality of readability or playability of the media disc 16 can be measured in any suitable manner such as, for example, commercially available software or hardware solutions. The determination of the quality of readability or playability enables the playability of the media disc 16 to be guaranteed in future rentals and/or sale. If the quality of readability or playability of the media disc 16 is not acceptable, that is, it is not at a predetermined allowable level (for example the errors or error rate is below a predetermined allowable number of errors or error rate), the controller 26 indicates to the customer that the buy back is declined and returns the media disc 16 to the customer. If the quality of readability or playability of the media disc 16 is acceptable, that is at a predetermined allowable level (for example the errors or error rate is below a predetermined number of errors or error rate), the controller 26 indicates to the customer that the buy back is accepted and the controller 26 prompts the customer to select the type of credit that the customer desires in payment for the media disc 16. The types of credit can include credit for use in the kiosk system, credit in retail store in which the kiosk is located, credit at another store retail store, or any other suitable credit. Once the customer selects the desired type of credit, the controller 26 activates the receipt printer 110 to print a receipt of the transaction and dispenses it to the customer. If the customer selected a retail store credit, the receipt can include a coupon for use in the retail store.

It is noted that each of the above-described features, components, and process steps can be used in any combination with the other features, components, and process steps depending on the desired use environment.

It is apparent from the forgoing that the present invention provides improved systems and methods which provide improved convenience to consumers for buying, renting, returning, and selling media discs. Additionally, the disclosed systems and methods improve the ability of the kiosks 10 to have inventory that is likely desired by the consumers visiting that kiosk 10.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A system for dispensing and receiving media discs comprising, in combination:

a storage system for storing a plurality of the media discs;

a dispense/receive system for dispensing the media discs to consumers and receiving media discs from customers;

a disc identification system for indentifying the media discs;

a disc transfer system for moving the media discs between the dispense/receive system and the disc identification system;

a control system operably connected to the dispense/receive system to selectively intake media discs and operably connected to the disc transfer system to selectively activate the disc transfer system to move the media discs between the dispense/receive system and the disc identification system;

a user interface system operably connected to the control system and including a buy-back indicator which can be selectively activated by the customer; and wherein, in response to activation of the buy-back indicator, the controller is adapted to activate the dispense/receive system to receive a media disc for buy-back, to activate the disc transfer system to move the media disc for buy-back from the dispense/receive system to the disc identification system, to activate the disc identification system to identify the media disc for buy-back, to determine a buy-back price for the media disc for buy-back, to activate the user interface system to inform the customer of the buy-back price and to provide the customer with an accept/decline input corresponding with the buy-back price, and to provide a credit to the customer upon activation of the accept/decline by the customer to accept the buy-back price.

2. The system according to claim 1, wherein the disc identification system includes an optical disc drive for reading prerecorded information on the media disc for buy-back to identify the media disc for buy-back.

3. The system according to claim 2, wherein the disc identification system includes a plurality of optical disc drives for reading different types of media discs.

4. The system according to claim 2, wherein the optical disc drive is adapted to check the playability of the media disc for buy-back.

5. The system according to claim 4, wherein the controller is adapted to decline buy-back and return the media disc for buy-back to the customer if the disc identification system determines the playability of the media disc for buy-back is below a predetermined level.

6. The system according to claim 1, wherein the controller is adapted to decline buy-back and return the media disc for buy-back back to the customer if the disc identification system cannot identify the media disc for buy-back.

7. The system according to claim 1, wherein the user interface system includes a touch video screen.

8. The system according to claim 1, wherein the user interface system includes a bar code scanner for reading a bar code on a protective cover of the media disc for buy-back.

9. A method for dispensing and receiving media discs comprising the steps of, in combination:

providing a storage system for storing a plurality of the media discs;

providing a dispense/receive system for dispensing the media discs to consumers and receiving media discs from customers;

providing a disc identification system for identifying the media discs;

providing a disc transfer system for moving the media discs between the dispense/receive system and the disc identification system;

providing a control system operably connected to the dispense/receive system to selectively intake and dispense media discs and operably connected to the disc transfer system to selectively activate the disc transfer system to move the media discs between the dispense/receive system and the disc identification system;

providing a user interface system operably connected to the control system and including a buy-back indicator which can be selectively activated by the customer; and in response to activation of the buy-back indicator, activating the dispense/receive system to receive a media disc for buy-back, activating the disc transfer system to move the media disc for buy-back from the dispense/receive system to the disc identification system, activating the disc identification system to identify the media disc for buy-back, determining a buy-back price for the media disc for buy-back, activating the user interface system to inform the customer of the buy-back price, activating the user interface system to provide the customer with an accept/decline input corresponding with the buy-back price, and providing a credit to the customer upon activation of the accept/decline by the customer to accept the buy-back price.

10. The method according to claim 9, further comprising the steps of providing the disc identification system with an optical disc drive and identifying the disc for buy-back by reading prerecorded information on the media disc.

11. The method according to claim 10, further comprising the step of checking the playability of the media disc for buy-back using the optical disc drive.

12. The method according to claim 11, further comprising the steps of declining buy-back and returning the media disc for buy-back to the customer if the disc identification system determines the playability of the media disc for buy-back is below a predetermined level.

13. The method according to claim 9, further comprising the steps of declining buy-back and returning the media disc for buy-back to the customer if the disc identification system cannot identify the media disc for buy-back.

14. The method according to claim 9, further comprising the step of providing the user interface system with a touch video screen.

15. The method according to claim 9, further comprising the step of providing the user interface system with a bar code scanner for reading a bar code on a protective cover of the media disc for buy-back.

* * * * *